United States Patent
Yin et al.

(10) Patent No.: US 11,797,455 B2
(45) Date of Patent: Oct. 24, 2023

(54) CACHE MANAGEMENT BASED ON REUSE DISTANCE

(71) Applicant: ADVANCED MICRO DEVICES, INC., Santa Clara, CA (US)

(72) Inventors: Jieming Yin, Bellevue, WA (US); Subhash Sethumurugan, Bellevue, WA (US); Yasuko Eckert, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/600,897

(22) Filed: Oct. 14, 2019

(65) Prior Publication Data
US 2021/0109861 A1    Apr. 15, 2021

(51) Int. Cl.
| | |
|---|---|
| G06F 12/12 | (2016.01) |
| G06F 12/0891 | (2016.01) |
| G06F 12/0855 | (2016.01) |
| G06F 12/126 | (2016.01) |
| G06F 12/0897 | (2016.01) |
| G06F 12/0871 | (2016.01) |

(52) U.S. Cl.
CPC ...... *G06F 12/0891* (2013.01); *G06F 12/0855* (2013.01); *G06F 12/0871* (2013.01); *G06F 12/0897* (2013.01); *G06F 12/126* (2013.01)

(58) Field of Classification Search
CPC ............. G06F 12/0253; G06F 12/0261; G06F 12/0808; G06F 12/0855; G06F 12/0871; G06F 12/0891; G06F 12/0897; G06F 12/121; G06F 12/122; G06F 12/123; G06F 12/126; G06F 12/127; G06F 12/128

USPC ............... 711/133–136, 159, 160, 118, 128
See application file for complete search history.

(56) References Cited

U.S. PATENT DOCUMENTS

| | | | |
|---|---|---|---|
| 2008/0320228 A1 | 12/2008 | Brunheroto et al. | |
| 2014/0129779 A1 | 5/2014 | Frachtenberg et al. | |
| 2014/0281740 A1 | 9/2014 | Casado et al. | |
| 2014/0369348 A1 | 12/2014 | Zhang et al. | |
| 2016/0062916 A1* | 3/2016 | Das ..................... | G06F 12/1027 711/133 |
| 2016/0232093 A1* | 8/2016 | Kim .................... | G06F 12/0811 |

(Continued)

FOREIGN PATENT DOCUMENTS

KR        20190058316 A       5/2019

OTHER PUBLICATIONS

Duong, Nam, et al., "Improving Cache Management Policies Using Dynamic Reuse Distances", 45th Annual IEEE/ACM International Symposium on Microarchitecture, Dec. 1-5, 2012, 12 pages.

(Continued)

*Primary Examiner* — Ilwoo Park

(57) ABSTRACT

A cache of a processor includes a cache controller to implement a cache management policy for the insertion and replacement of cache lines of the cache. The cache management policy assigns replacement priority levels to each cache line of at least a subset of cache lines in a region of the cache based on a comparison of a number of accesses to a cache set having a way that stores a cache line since the cache line was last accessed to a reuse distance determined for the region of the cache, wherein the reuse distance represents an average number of accesses to a given cache set of the region between accesses to any given cache line of the cache set.

24 Claims, 6 Drawing Sheets

(56) References Cited

U.S. PATENT DOCUMENTS

2019/0155750 A1\* 5/2019 Wang .................. G06F 12/0811
2019/0188154 A1\* 6/2019 Basu Roy Chowdhury ................
                                                                  G06F 12/1027
2020/0117601 A1\* 4/2020 Kaneda ............... G06F 12/0888

OTHER PUBLICATIONS

International Search Report and Written Opinion dated Nov. 13, 2020 in Application No. PCT/US2020/046390, 12 pages.
International Preliminary Report on Patentability dated Apr. 28, 2022 for PCT/US2020/046390, 9 pages.

\* cited by examiner

CACHE MANAGEMENT BASED ON REUSE DISTANCE

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Processing systems employ caches to temporarily buffer data from memory or a mass storage device for rapid access. As caches have limited storage capacity, a cache management policy typically is employed to direct the selection of cache lines for replacement when a corresponding region of the cache is full. However, some conventional cache management policies, such as those based on least recently used (LRU) or re-reference interval prediction (RRIP) principles, are less efficient when dealing with irregular accesses to cache lines, or require relatively complex circuitry implementations that can limit their applicability.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate systems and techniques for implementing a cache management policy for a cache of a processing system that is based on a "reuse distance" predicted for a corresponding region of a cache. As described herein, the reuse distance for a corresponding region of the cache is a representation of a historical average number of accesses to a given cache set of the region of the cache between accesses to a given cache line of that cache set. This reuse distance then is used as a predictor or other indicator of how many accesses are likely to occur to a given cache set before a given cache line in that cache set is accessed again, and this information, along with information regarding the recent access history of a cache line, is used to assign a replacement priority to the cache line. The replacement priorities of the cache lines assigned in this manner then are used in accordance with the cache management policy to select cache lines for replacement when the corresponding cache sets are fully occupied. This reuse distance-based approach to cache management can provide accurate and effective prioritization for replacement of cache lines likely to be used in cyclical or streaming access patterns, and in a manner that is relatively straightforward for implementation in hardware.

Figure 1:
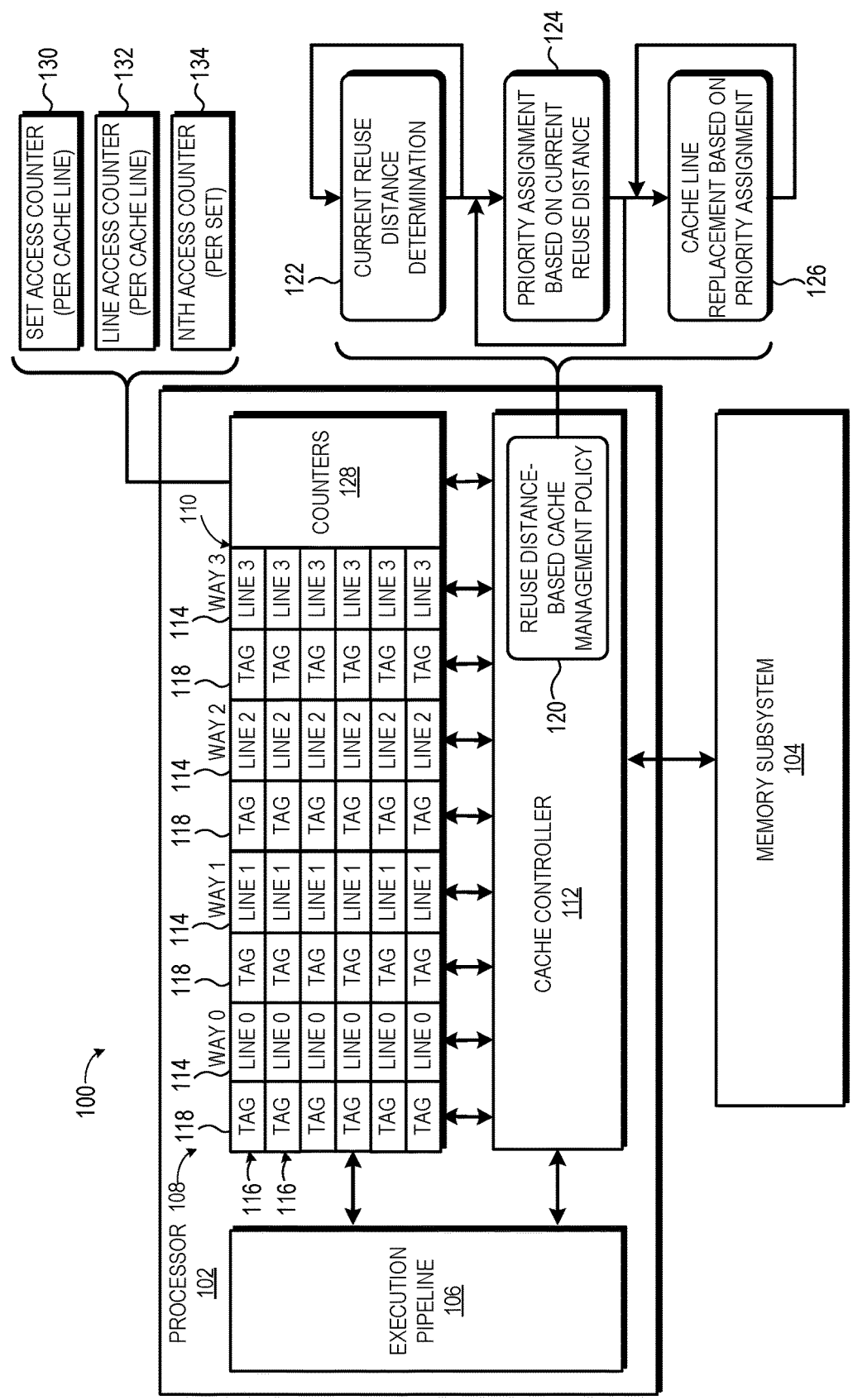
FIG. 1 is a block diagram of a processing system having a cache implementing a reuse distance-based cache management policy in accordance with some embodiments.

FIG. 1 illustrates a processing system 100 employing reuse distance-based cache management in accordance with some embodiments. The processing system 100 includes a processor 102 coupled to a memory subsystem 104, wherein the memory subsystem 104 includes one or more system memories, scratchpad memories, disk drives, or other mass storage devices. The processor 102 is, for example, a central processing unit (CPU), graphics processing unit (GPU), accelerated processing unit (APU), digital signal processor (DSP), or a combination thereof. The processor 102 includes one or more execution pipelines 106 (e.g., CPU cores) and a cache hierarchy of one or more caches, including a cache 108. The cache 108 includes a cache array 110 and a cache controller 112. The cache array 110 includes a plurality of entries 114 to store cache lines (that is, a block of temporarily buffered data) for access by the one or more execution pipelines 106. In at least one embodiment, the cache 108 is a set-associative cache such that the cache line entries 114 are arranged in a plurality of cache sets 116, with each cache set 116 having a plurality of ways, each way being a cache line entry 114 operable to store a corresponding cache line and such that any cache line associated with a memory address that maps to the cache set 116 can be stored in any way of that cache set 116. In the illustrated example, the cache 108 implements four ways, way 0 to way 3, but more or fewer ways can be implemented. Each cache set 116 includes additional fields, such as a tag field 118 for each way of the set, wherein the tag field 118 stores a portion of a memory address associated with the valid cache line stored in the corresponding way (if any), status bits, control bits, and the like.

The cache controller 112 operates to maintain the various fields of the cache array 110 based on activities of the one or more execution pipelines 106, including receiving and storing blocks of data as cache lines, accessing cache lines for use or modification by the one or more execution pipelines 106, accessing cache lines for eviction or flushing to the memory subsystem 104, and the like. As part of this process, the cache controller 112 implements a cache management policy 120 that controls the prioritization of cache lines for replacement or other eviction and controls the selection of candidate cache lines for replacement or other eviction based on such prioritization. In at least one embodiment, the cache management policy 120 utilizes a "reuse distance" determined for a corresponding region of the cache 108 (this region may be a portion (e.g., one-fourth) of the cache 108 or the entirety of the cache 108) and a recent history of accesses to a cache line in that corresponding region to determine a replacement priority for that cache line. Though the reuse distance is determined for a portion of the cache in this embodiment, the cache management policy 120 also can be applied to the entire cache 108. As noted above, at a high level this reuse distance represents an average number of accesses to a cache set 116 in the corresponding cache region between accesses to a particular cache line within a cache set 116. That is, the reuse distance represents a prediction of the average number of cache accesses likely to occur to any given cache set of the corresponding region of the cache 108 before a given cache line of that cache set is accessed again. To this end, the cache management policy 120 implements three stages, each of which operates independently and concurrently with the other phases: a reuse distance determination stage 122, a replacement priority assignment stage 124, and a cache line replacement stage 126. The reuse distance determination stage 122 provides for the calculation of a current reuse distance for each applicable region of the cache 108, and is described in greater detail below with reference to FIGS. 2-4. The replacement priority assignment stage 124 provides for the assignment of replacement priorities to cache lines based on the current reuse distance calculated at the most recent calculation cycle of stage 122, and is described in greater detail below with reference to FIGS. 5 and 6. The cache line replacement stage 126 provides for the selection of cache lines for replacement based on assigned replacement priorities as determined from the most recent prioritization cycle of stage 124, and is described in greater detail below with reference to FIG. 7.

In at least one embodiment, the cache 108 employs a set 128 of counters for use in calculating the current reuse distance at each iteration of stage 122 and for use in determining replacement priorities for cache lines at each cycle of stage 124. This set 128 of counters includes a set access counter 130 and a line access counter 132 for each way (that is, per cache line) of the cache array 110 or, alternatively, for each way of a subset of cache sets designated as representative cache sets of the cache 108 (e.g., every Xth cache set of the region, X being an integer greater than 1) for sampling purposes. The set access counter 130 stores a set access count value that represents the number of times an access has occurred to the cache set 116 associated with the corresponding cache line since the cache line was inserted or last accessed. The line access counter 132 stores a line access count value that represents the number of times the corresponding cache line has been accessed since being inserted into the cache 108 or since being reset in response to the start of a next calculation cycle. In some embodiments, the set 128 of counters further includes an Nth access counter 134 that counts the number of accesses to a corresponding cache set 116 before resetting after the Nth counted access (and triggering further operations, as described below), where N represents a programmable or otherwise specified integer greater than one (N>1).

Figure 2:
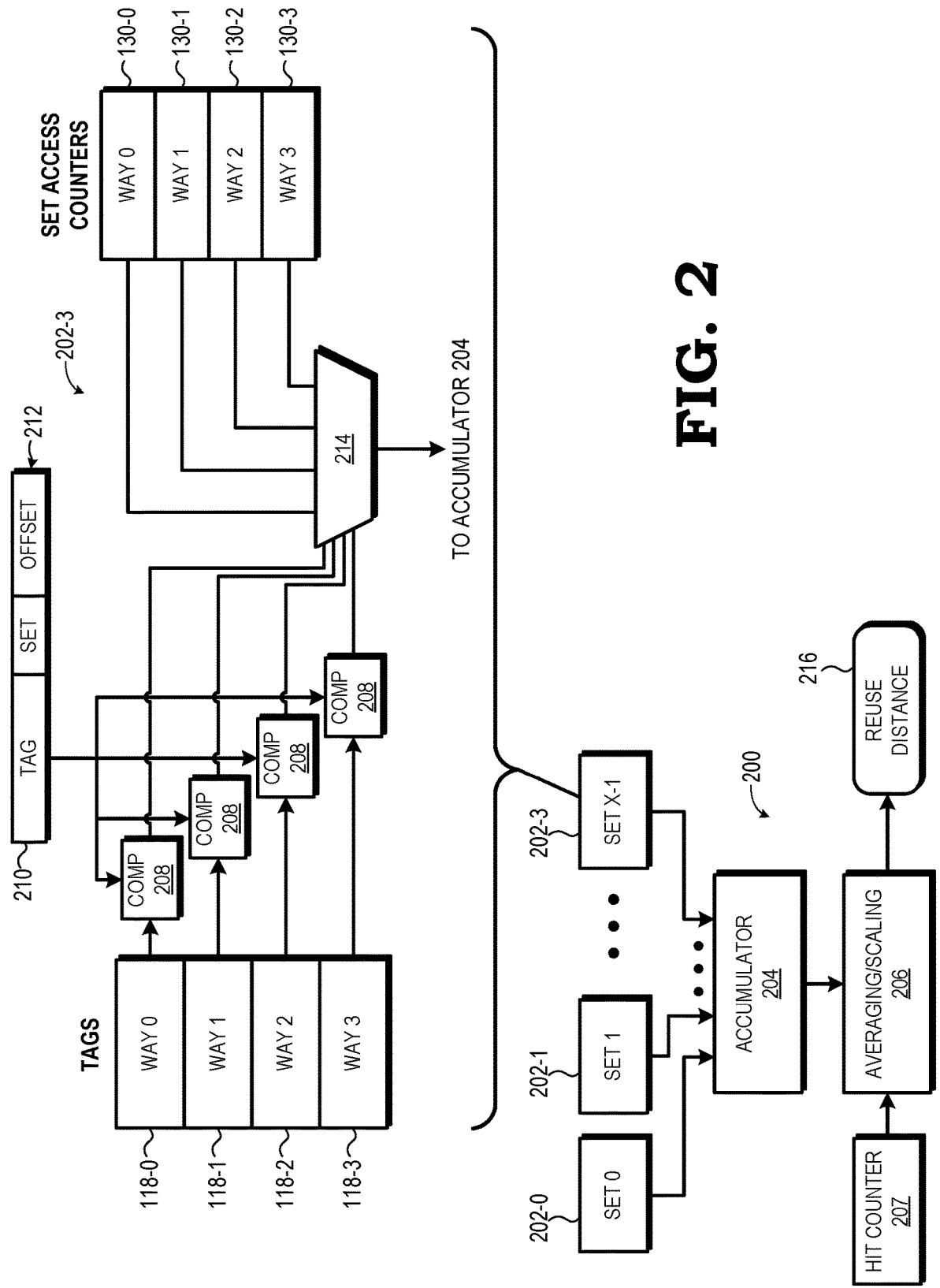
FIG. 2 is a block diagram illustrating a reuse distance calculation component of the cache of FIG. 1 in accordance with some embodiments.

FIG. 2 illustrates an implementation of a reuse distance calculation component 200 implemented by the cache controller 112 and accessing the set 128 of counters in accordance with some embodiments. The reuse distance calculation component 200 includes a set accounting component 202 for each cache set 116 utilized for calculating the reuse distance for a corresponding region of the cache 108. This can include each cache set 116 in the cache region, or a representative subset of the cache sets 116 of the cache region. In the depicted example, there are X cache sets 116 represented (X>=1), with the set accounting components 202-0, 202-1, and 202-3 illustrated for cache set 0, cache set 1, and cache set X-1 of the represented cache sets 116. The reuse distance calculation component 200 further includes an accumulator 204 and an averaging/scaling component 206. In one embodiment, the reuse distance calculation component 200 also includes a hit counter 207 that serves to count the number of cache hits to the corresponding region of the cache 108 for the current calculation cycle, and to trigger a reuse distance calculation when the number of cache hits reaches a programmable or otherwise specified value K. To illustrate, the hit counter 207 can be implemented as a countdown counter that is reset to K for each calculation cycle, decremented for each cache hit to a representative cache set, and triggers a reuse distance calculation when it reaches 0.

The configuration of the set accounting component 202-3 for set X-1 is illustrated and is representative of the configuration of each set accounting component 202 relative to its corresponding cache set 116. As shown, the set accounting component 202-3 includes a set of comparators 208, one for each way in the corresponding cache set 116, and selection logic 214 (depicted as a multiplexer for ease of illustration). Thus, for the depicted example of cache 108 having sets with four ways, the set accounting component 202-3 includes four comparators 208. Each comparator 208 includes an input coupled to receive an address value from the tag field of the corresponding way of the set (e.g., one of tag fields 118-0 to 118-3 for ways 0 to 4, respectively) and an input to receive an address value from a tag field 210 of a cache probe 212 submitted to the cache 108 from the execution pipeline 106. Each comparator 208 further has an output that is asserted when the address value from the tag field 118 of the corresponding way matches the address value of the tag field 210 of the cache probe 212; that is, the comparator 208 associated with the way of the cache set 116 that is the target of the cache probe 212 (i.e., provides a cache "hit" for the cache probe 212) asserts its output, while the other comparators 208 of the set accounting component 202-3 remain unasserted. In this manner, the outputs of the comparators 208 identify the way containing the cache line having an address that matches the address represented in the cache probe 212.

As described above, the set 128 of counters includes a set access counter 130 for each way of each representative cache set 116 utilized for reuse distance calculation. Accordingly, for set X-1 associated with the illustrated set accounting component 202-3, the set 128 of counters includes four set access counters 130-0, 130-1, 130-2, and 130-3 for ways 0, 1, 2, and 3, respectively. Each of the set access counters 130-0 to 130-3 stores a set access count value representative of the number of accesses to the set X-1 since the cache line in the corresponding way has been inserted or last accessed, as described in greater detail below.

The selection logic 214 includes a plurality of selection inputs, each coupled to receive the current selection access count value of a corresponding one of the set access counters 130 for the cache set 116. Thus, in the four way cache set 116, the selection logic 214 has four selection inputs, one to receive the count value from set access counter 130-0, one to receive the count value from set access counter 130-1, one to receive the count value from set access counter 130-2, and one to receive the count value from set access counter 130-3. The selection logic 214 further includes a selection control input coupled to the outputs of the comparators 208, and an output coupled to the accumulator 204. Thus, the selection logic 214 operates to select one of the input selection access count values from the set access counters 130-0 to 130-3 for output to the accumulator 204 based on which comparator 208, if any, has an asserted output. That is, the way of the cache set 116 having a tag address that matches the tag address of the cache probe 212 triggers the selection logic 214 to output the counter value of the set access counter 130 associated with that way to the accumulator 204.

The accumulator 204 operates to accumulate set access counter values received from the various set accounting components 202 and provide a resulting updated accumulated value to the averaging/scaling component 206. In response to a trigger event (e.g., every Kth access to the representative cache sets of the region), the averaging/scaling component 206 operates to average the most recent updated accumulated value over the number of accesses to the representative cache sets of the region since the last calculation cycle to generate an average set access count value from the accumulated value. The average set access count value can be obtained via, for example, a sequence of shift operations, and in some embodiments the average/scaling component 206 scales the resulting average set access count value using a specified scaling factor. The resulting averaged/scaled set access count value then serves as the current reuse distance 216 for the corresponding region of the cache 108.

Figure 3:
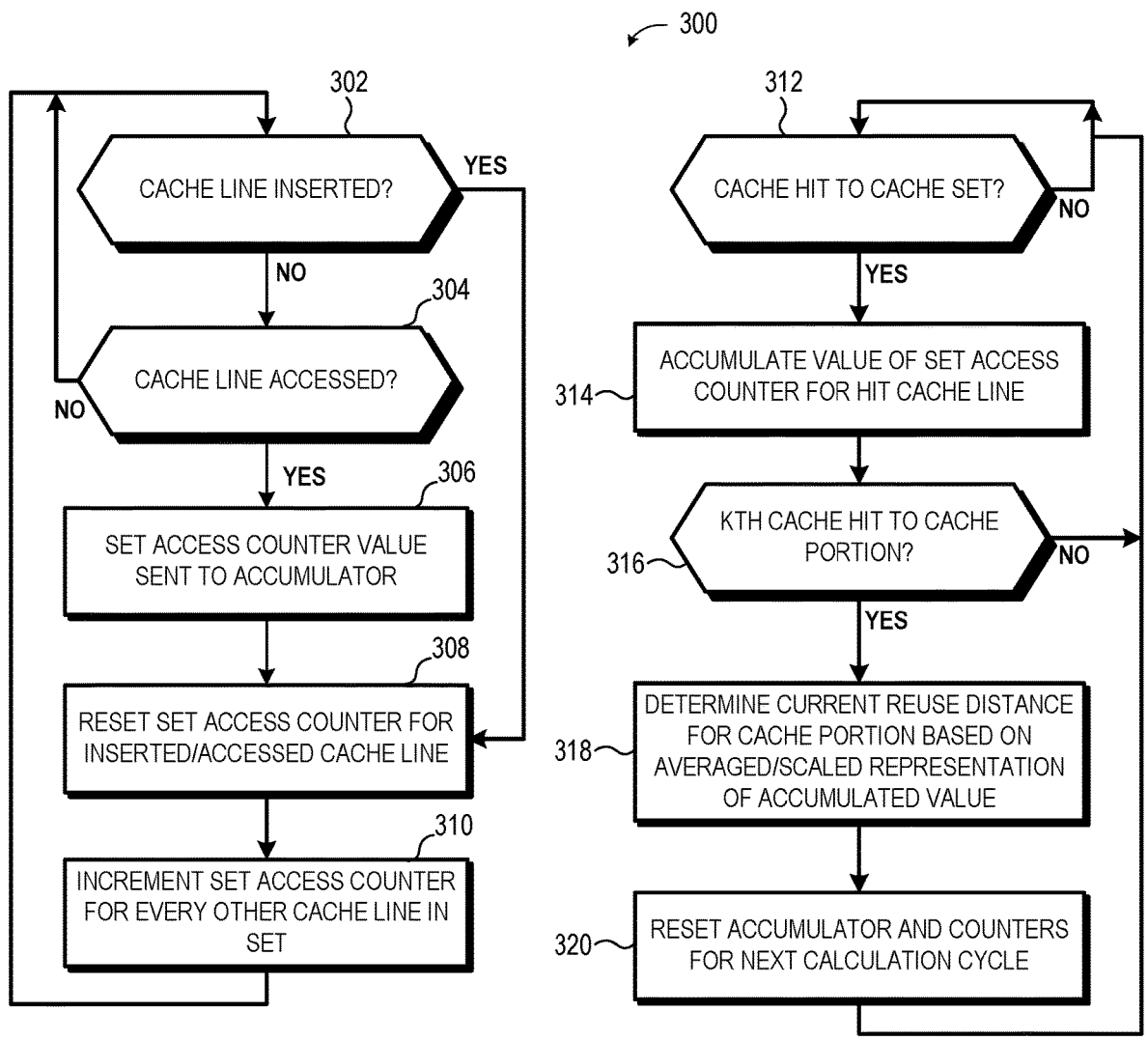
FIG. 3 is a flow diagram illustrating a method for calculating a current reuse distance of a corresponding region of the cache of FIGS. 1 and 2 in accordance with some embodiments.

FIG. 3 illustrates a method 300 depicting the reuse distance calculation process employed by the reuse distance calculation component 200 of FIG. 2 of the cache controller 112 in greater detail in accordance with some embodiments. At block 302, the cache controller 112 monitors operations of the cache 108 to determine whether a cache line has been inserted into one of the representative cache sets 116. At block 304, the cache controller 112 monitors operations of the cache 108 to determine whether a cache line in one of the representative cache sets 116 has been accessed. If a cache line has been accessed, at block 306 the set access counter 130 value associated with the way of the cache set 116 that stores the accessed cache line is sent to the accumulator 204. When a cache line has been inserted or accessed, at block 308 the cache controller 112 resets the set access counter 130 associated with the way of the cache set 116 that stores the inserted or accessed cache line to a predetermined value (e.g., 0) and at block 310 the cache controller 112 increments the set access counter 130 associated with every other way of that cache set 116. That is, insertion of a cache line or access to a cache line in a way of a representative cache set 116 resets the set access counter 130 for that way of the cache set 116 while also causing the set access counter 130 for every other way of the cache set 116 to increase. Alternatively, the cache controller 112 increments the set access counter 130 associated with each way of the cache set 116 and then resets the set access counter 130 associated with the way of the cache set 116 that stores the inserted or accessed cache line to a predetermined value. Thus, in this manner, the cache controller 112 monitors, for each cache line in the representative cache set 116, the number of accesses made to the representative cache set 116 since the cache line was inserted or last accessed.

Further, at block 312 the cache controller 112 monitors for a cache hit to a way of a representative cache set 116 (which can include the access referenced at block 302). In at least one embodiment, the cache hit to a way of a representative cache set 116 is signaled via the comparators 208 of the set accounting component 202 associated with the representative cache set 116, in that when there is a match between the address represented in a cache probe (e.g., the cache probe 212, FIG. 2) and the address in the tag field 118 of the corresponding way, the output of the corresponding comparator 208 is asserted, and thus signaling that the cache probe has hit on that way of that representative cache set 116. In response to such a cache hit, at block 314 the selection logic 214 of the set accounting component 202 associated with the hit cache set 116 outputs the value of the set access counter 130 associated with the hit way of the hit cache set 116 to the accumulator 204, whereupon the accumulator 204 adds the input value to the previous accumulated value for the current calculation cycle.

The process of blocks 312 and 314 is repeated for each cache hit to a representative cache set 116 until the Kth cache hit to the corresponding region of the cache 108 is detected (via, e.g., the hit counter 207) in the current calculation iteration, where K is a programmable or other otherwise specified integer value greater than 1 (K>1). For example, K can be set to 64 such that the set count accumulation process continues until the $64^{th}$ cache hit to the corresponding region of the cache 108 occurs. In response to determining, at block 316, that the Kth cache hit to the region of the cache 108 has occurred for the current calculation cycle, then at block 318 the averaging/scaling component averages the current accumulated value from the accumulator 204 over the K cache hits utilized for the current calculation cycle, and in some embodiments, scales this averaged value by multiplying it by a factor. In implementations where K and any scaling factor are powers of two, the averaging/scaling component 206 can be implemented as right and left shift logic. To illustrate, when K is set to 64 (2^6) per the previous example, the averaging of the accumulated value can be performed by right shifting the accumulated value by 6 bits and then left shifting by one bit. More generally, when K equals 2^M (M being a positive integer), then the averaging/scaling component 206 can left shift the current updated accumulated value by M bit positions and then right by one bit position to obtain the average set access count over the K cache accesses to the representative cache sets. Similarly, a scaling of the averaged value by 2 can be achieved by left shifting the resulting averaged value by 1 bit. The resulting average (and scaled) value is then set as the current reuse distance 216 for the corresponding region of the cache 108. Scaling of the average accounts for situations where there may be a disparity between set access count values for individual ways in the set resulting in a reuse distance that is lower than the set access count value for some of the lines in the set. As explained in more detail below, once the set access count value for a given line exceeds the reuse distance of the cache, the line is more likely to be evicted. Scaling the average can be used to prevent some lines in the set from being inadvertently prioritized for replacement. With the current calculation cycle concluded, at block 320 the cache controller 112 resets the various components used in the concluded calculation cycle, such as the hit counter 207, the set access counters 130, the line access counters 132, and the accumulator 204, and then the process returns to block 312 for the next calculation cycle.

Figure 4:
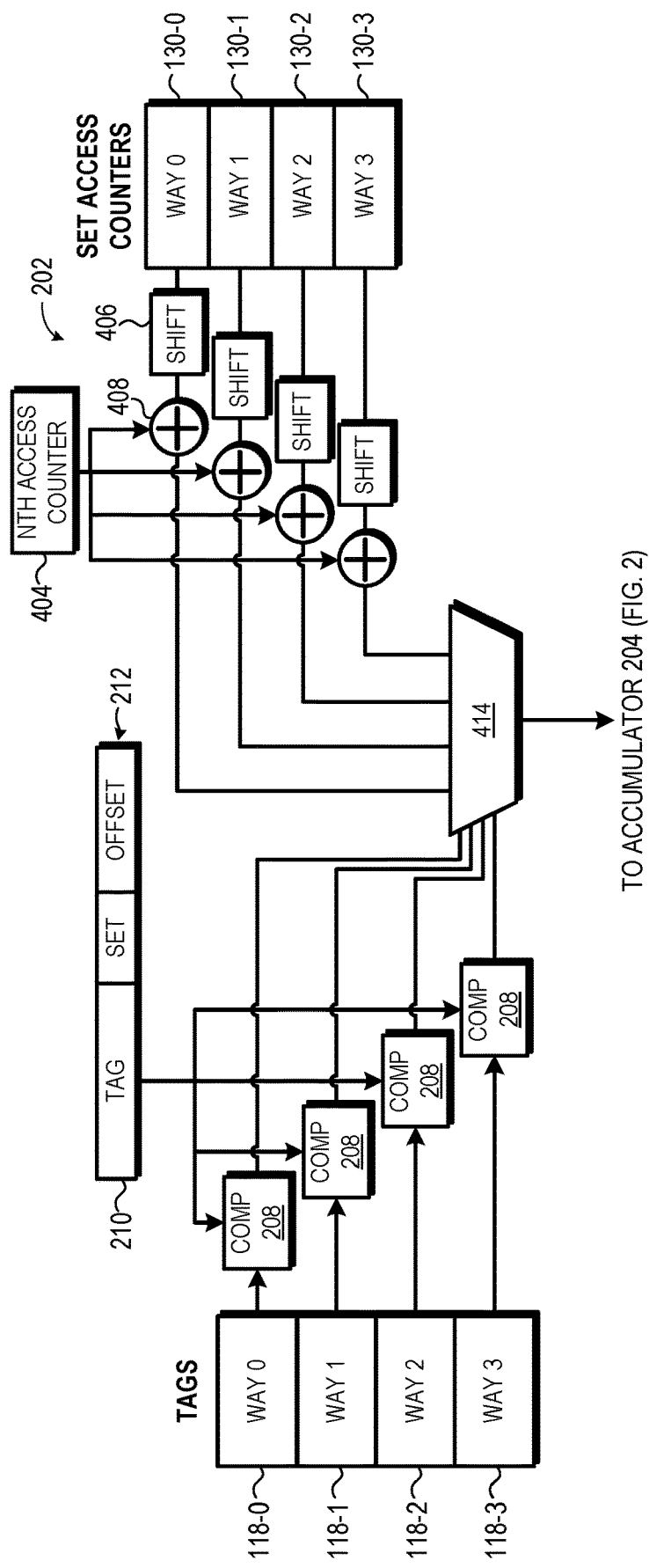
FIG. 4 is a block diagram illustrating an alternative implementation of the reuse distance calculation component in accordance with some embodiments.

FIG. 4 illustrates an alternative implementation for the set accounting component 202 (FIG. 2) implemented by the cache controller 112 for each representative cache set 116 in accordance with at least one embodiment. As with the implementation of FIG. 2, the alternative implementation of the set accounting component 202 of FIG. 4 includes the comparators 208 operable to assert their respective outputs responsive to the address in a tag field 118 of the corresponding way matching the address in the tag field 210 of the received cache probe 212, and further includes selection logic 414 (depicted as a multiplexer for ease of illustration) that utilizes the outputs of the comparators 208 as its selection control input. However, rather than using counters for the set access counters 130 that are large enough to account for every access to the corresponding cache set during a calculation cycle, the implementation of FIG. 4 instead increments the set access counters 130 every Nth access to the cache set 116, thereby allowing smaller counters to be used for the set access counters 130. To facilitate counting accesses by N, the illustrated implementation of the set accounting component 202 further includes an Nth access counter 404 that is incremented for each access to the cache set 116 during the current calculation cycle (or is reset to N and decremented for each access). Further, to compensate for the fact that only every Nth access to the cache set 116 triggers incrementation of the set access counters 130 of that cache set, the illustrated implementation employs a shift register 406 and an adder 408 between the output of each set access counter 130 and the corresponding input into the selection logic 414 to adjust for this sampled cache access approach. Thus, assuming that N is a power of 2 ($2^j$), then the set access count value output from the set access counter 130 is left shifted by j bits and then added to the current hit count represented in the Nth access counter 404, and this resulting value is fed into the corresponding input of the selection logic 414. The selection logic 414 is then operable to select one of the input values for output to the accumulator 204 based on the states of the outputs of the comparators 208, which in turn represents which way of the representative cache set 116, if any, is the target of the Nth cache probe 212.

Figure 5:
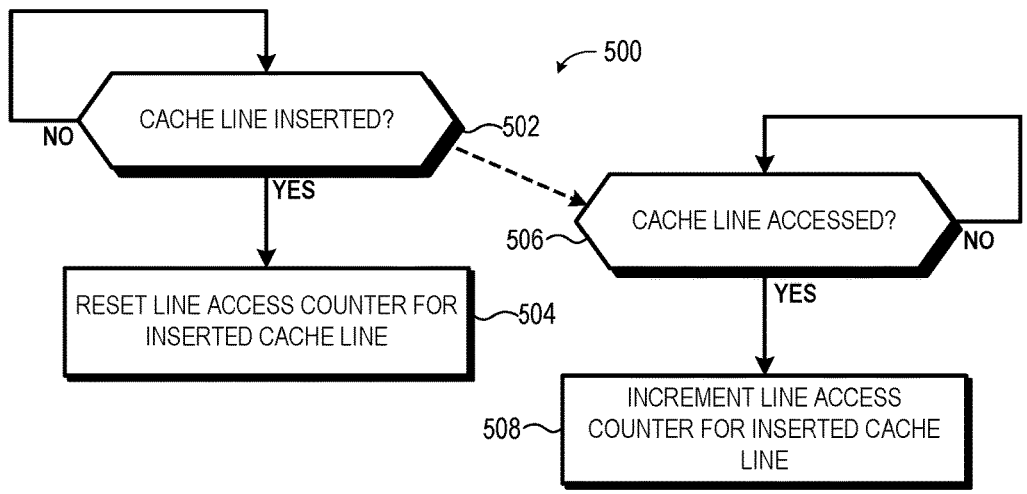
FIG. 5 is a flow diagram illustrating a method for maintaining a line access counter for a corresponding cache line in accordance with some embodiments.
Figure 6:
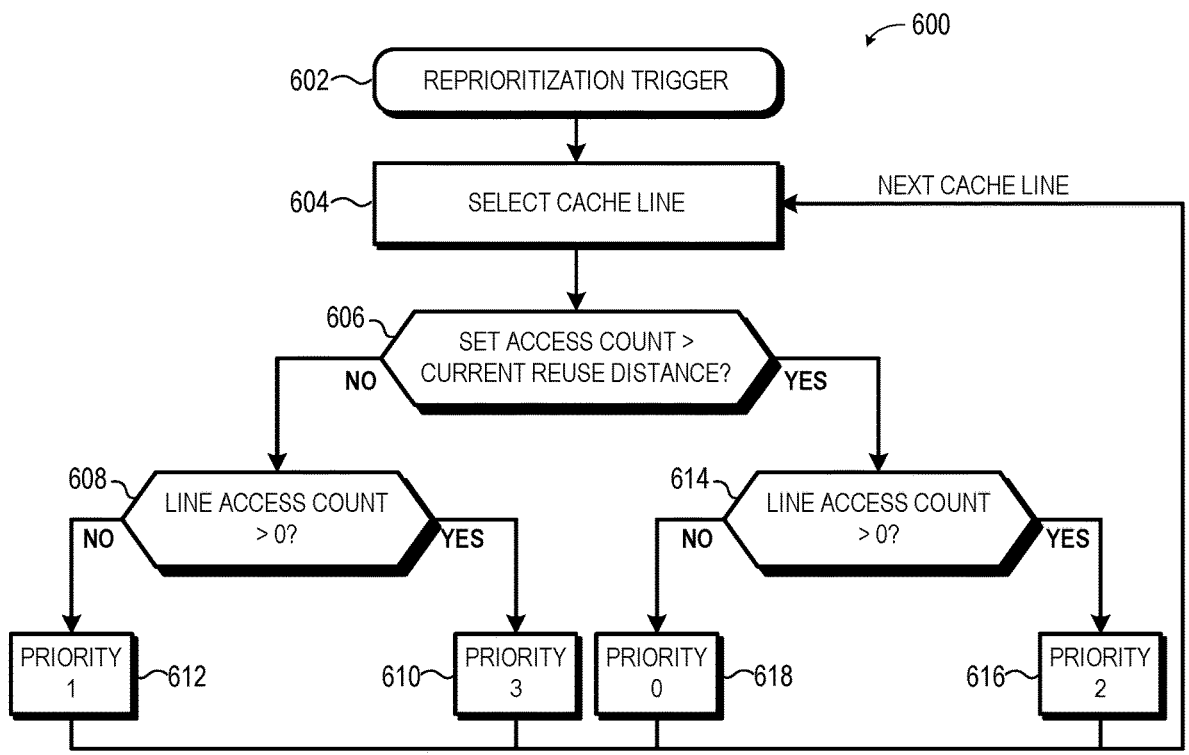
FIG. 6 is a flow diagram illustrating a method for assigning a replacement priority level to a cache line based on a current reuse distance and a corresponding line access count value in accordance with some embodiments.

FIGS. 5 and 6 together illustrate the operation of the cache controller 112 for implementing the cache management policy 120 during the replacement priority assignment stage 124 (FIG. 1) in accordance with some embodiments. FIG. 5 illustrates a method 500 of maintaining the line access counters 132 for the representative cache sets 116 during a prioritization cycle in accordance with some embodiments. As explained above, each line access counter 132 represents the number of times a cache line stored in the way associated with the line access counter 132 has been accessed since the start of the current prioritization cycle. Accordingly, with the start of a prioritization cycle, at block 502 the cache controller 112 monitors for the insertion of a cache line into a way of a representative cache set 116. In response to such an insertion, at block 504 the cache controller 112 resets the line access counter 132 associated with the target way of that representative cache set 116. Thereafter, at block 506 the cache controller 112 monitors for an access to the cache line. In response to detecting an access, at block 508 the cache controller 112 increments the line access counter 132 for the accessed cache line. In some embodiments, the line access counter 132 is implemented as a one-bit or two-bit saturation counter so as to reduce hardware requirements for the line access counters 132, and thus either counts up to one access (for a one-bit counter implementation) or up to 3 accesses (for a two-bit counter implementation). In other embodiments, more than two bits are utilized for the line access counters 132 to facilitate counting a larger number of accesses to any given cache line.

Turning to FIG. 6, a method 600 representing the assignment of a replacement priority to a cache line based on its current line access count in the corresponding line access counter 132 and based on the current reuse distance is illustrated in accordance with some embodiments. The method 600 is initiated by an event (block 602), such as a determination that a cache line is to be replaced, that serves as a trigger to determine the replacement priorities for cache lines newly inserted during the current prioritization cycle and to redetermine the replacement priorities for previously-present cache lines. In response to the trigger, the prioritization process initiates by the selection of a cache line of the region of the cache 108 at block 604 in accordance with a selection sequence, e.g., a straight order selection, pseudo random selection, and the like.

At block 606, the cache controller 112 accesses the set access counter 130 of the way storing the selected cache line and compares the count contained therein to the current reuse distance 216. If the set access counter 130 is not greater than the current reuse distance 216, this indicates that the cache line has not yet reached the reuse distance, and thus might be reused in the future. Accordingly, if the set access counter 130 is less than the current reuse distance, at block 608 the cache controller 112 accesses the line access counter 132 associated with the way storing the selected cache line and determines whether the value stored therein is greater than zero (that is, determines whether the cache line has been reused since insertion). If so, there is potential for this cache line to be reused yet again in view of the propensity for some data to be accessed repeatedly. As such, if the line access counter 132 is determined to be greater than zero at block 608, then the cache line is assigned replacement priority level 3 at block 610 (for the following, it is assumed that the lower the replacement priority level value, the less suitable the corresponding cache line is as a candidate for replacement and thus the greater the potential for selection of the corresponding cache line for replacement). Otherwise, if the line access counter 132 is equal to zero, this indicates that the cache line has not been reused; however, as the reuse distance has not yet been reached for the cache line, there is still some potential for the cache line being reused in the future. In such case, the cache line is assigned replacement priority level 1 at block 612 (with priority level 1 indicating a greater potential for selection for replacement than replacement priority level 3).

Returning to block 606, if it is determined that the access count represented by the set access counter 130 is greater than the current reuse distance, this means that the cache line has already reached the reuse distance but has not been reused since. Accordingly, at block 614 the cache controller 112 determines whether the cache line has been accessed by accessing the line access counter 132 for the way storing the cache line. If the line access counter 132 is greater than zero, this means that the cache line has been reused at least once since its insertion into the cache 108, and thus has the potential to be reused again. However, its potential for reuse is tempered by the fact that it has already passed the reuse distance. Accordingly, if the line access counter 132 is greater than zero, then the selected cache line is assigned replacement priority level 2 at block 616 (with replacement priority level 2 indicating a greater potential for selection for replacement than replacement priority level 3 and lower potential for selection than replacement priority level 1). Otherwise, if the count is equal to zero, this means that the cache line has not been reused since insertion and is already past the reuse distance and thus less likely to be reused in the future. In such case, the cache line is assigned replacement priority level 0 at block 618 (with replacement priority level 0 representing the greatest potential for selection for replacement in this example).

Figure 7:
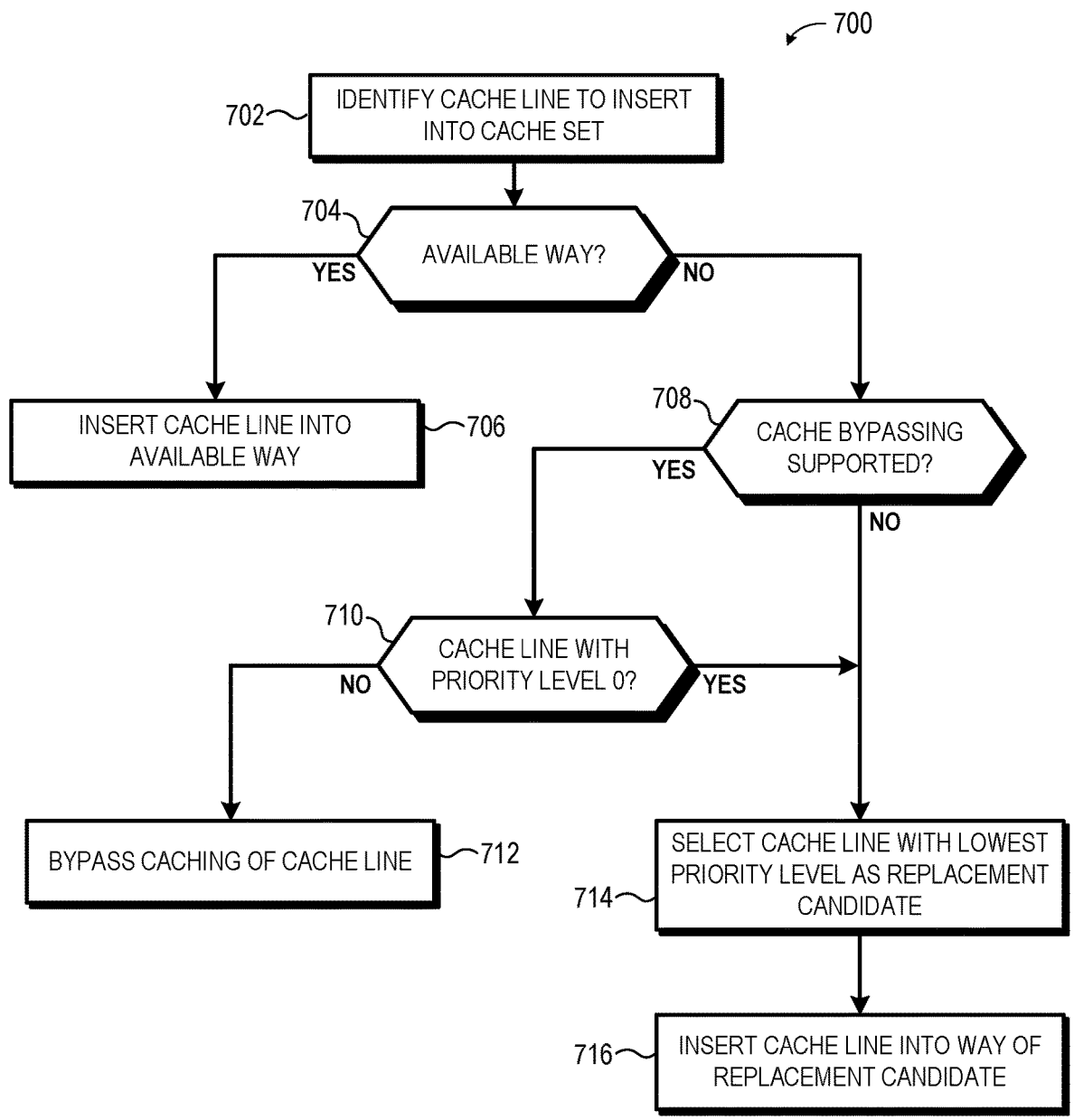
FIG. 7 is a flow diagram illustrating a method for selecting a cache line for replacement using reuse distance-based replacement priorities in accordance with some embodiments.

FIG. 7 illustrates a method 700 representing the operation of the cache controller 112 for the cache line replacement stage 126 (FIG. 1) of the cache management policy 120 in accordance with some embodiments. For the following, recall that for purposes of illustration the numerical increase in replacement priority level corresponds to an increasing priority to retain the corresponding cache line and, conversely, a numerical decrease in replacement priority level corresponds to an increasing priority or potential for evicting the corresponding cache line. At block 702, a load operation or store operation is performed and results in generation of a block of data to be stored as a cache line in the cache 108. Accordingly, further at block 702 the cache controller 112 determines the cache set 116 available for storing the cache line based on the address associated with the cache line. At block 704, the cache controller 112 determines whether there is an available way in the identified cache set 116 (that is, whether there is a way that is not currently storing a valid cache line). If so, then at block 706 the cache controller 112 inserts the cache line into the available way of the cache set 116. If the cache set 116 is a representative cache set, then the insertion of this cache line into the cache set 116 triggers certain counting operations as described above with reference to block 302 of FIG. 3 and block 502 of FIG. 5.

Otherwise, if no way is available in the identified cache set 116, then the cache controller 112 determines whether to evict a current cache line in the cache set 116, or to bypass caching of the cache line, based on the replacement priority levels assigned during the replacement priority assignment stage 124 of the cache management policy 120, as described above. Accordingly, at block 708, the cache controller 112 determines whether cache bypassing (also known as "selective caching" or "cache exclusion") is supported by the cache 108. If cache bypassing is supported, then at block 710 the cache controller 112 determines whether the cache set 116 contains any cache lines assigned replacement priority level 0. If not, then the cache controller 112 at block 712 can elect to bypass caching of the cache line in the cache 108 (e.g., by preventing any caching of the cache line, or by providing the cache line to a lower level cache for storage). In another embodiment, if the cache line is determined to be part of a streaming process (e.g., the current reuse distance is small (0 or 1)), then cache bypass can be elected if there also are no cache lines with replacement priority level 1 as well.

If cache bypassing is not supported, or there are not any cache lines of sufficiently low prioritization level to justify cache bypassing, then at block 714 the cache controller 112 selects the cache line in the cache set 116 having the lowest replacement priority level as the replacement candidate. In the event that there are two or more cache lines with the same lowest replacement priority level, then the cache controller 112 can select one of the cache lines pseudo-randomly, based on a specified selection order, or select the way with the largest set access count. At block 716, the cache controller 112 replaces or otherwise evicts the selected candidate cache line with the new cache line in the corresponding way of the cache set 116. This action is a cache line insertion, and thus triggers certain counting operations as described above with reference to block 302 of FIG. 3 and block 502 of FIG. 5.

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

In accordance with one aspect, a method for managing a cache of a processing system includes determining, by a cache controller of the cache, a reuse distance for a region of the cache, the reuse distance representing an average number of accesses to a given cache set of the cache between accesses to a given cache line of the cache set. The method further includes assigning, by the cache controller, a replacement priority level to each cache line of at least a subset of the cache lines of the region of the cache based on the reuse distance and a count of a number of cache hits to the cache line.

In accordance with another aspect, a method for managing a cache of a processing system includes implementing, by a cache controller of the cache, a cache management policy for the insertion and replacement of cache lines of the cache, the cache management policy providing for assignment of replacement priority levels to each cache line of at least a subset of cache lines in a region of the cache based on a comparison of a number of accesses to a cache set having a way that stores a cache line since the cache line was last accessed to a reuse distance determined for the region of the cache, the reuse distance representing an average number of accesses to a given cache set of the region between accesses to any given cache line of the cache set.

In accordance with yet another aspect, a processor includes a cache including a plurality of cache sets, each cache set having a plurality of ways configured to store corresponding cache lines. The processor further includes a cache controller configured to implement a cache management policy for the insertion and replacement of cache lines of the cache, the cache management policy providing for assignment of replacement priority levels to each cache line of at least a subset of cache lines in a region of the cache based on a comparison of a number of accesses to a cache set having a way that stores the cache line since the cache line was last accessed to a reuse distance determined for the region of the cache, the reuse distance representing an average number of accesses to a given cache set of the region between accesses to any given cache line of the cache set.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities can be performed, or elements included, in addition to those described. Still further, the order in which activities is listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A method for managing a cache of a processing system, comprising:
   determining, by a cache controller of the cache, a reuse distance for a region of the cache, the reuse distance representing an average of at least a first number of accesses to a given cache set of the cache per access to a given cache line of the given cache set and a second number of accesses to the given cache set per access to the given cache line, wherein the first number is different from the second number; and
   assigning, by the cache controller, a replacement priority level to each individual cache line of at least a subset of the cache lines of the region of the cache based on the reuse distance and a count of a number of cache hits to the individual cache line.

2. The method of claim 1, further comprising:
   selecting a cache line for replacement at the region of the cache based on the replacement priority level assigned to the cache.

3. The method of claim 1, wherein determining the reuse distance comprises:
   responsive to each cache hit at a cache set of at least a subset of cache sets of the region of the cache:
      adding a set access count value associated with a way of the cache set that contains a cache line that is a target of the cache hit to an accumulated value to generate an updated accumulated value;
      resetting the set access count value associated with the way of the cache set that contains the cache line that is the target of the cache hit; and
      incrementing set access count values associated with the other ways of the cache set; and
   responsive to detecting a specified number of cache hits to the at least a subset of cache sets:
      averaging the updated accumulated value by the specified number of cache hits to generate an average set access count value; and
      determining a reuse distance based on the average set access count value.

4. The method of claim 3, further comprising:
   responsive to detecting the specified number of cache hits to the at least a subset of cache sets:
      scaling the average set access count value by a specified factor to generate a scaled average set access count value; and
   wherein determining the reuse distance comprises determining the reuse distance based on the scaled average set access count value.

5. The method of claim 3, wherein assigning a replacement priority level to each cache line of at least a subset of the cache lines of the region of the cache comprises:
   responsive to determining that the set access count value associated with the cache line is not greater than the reuse distance and responsive to determining that a number of accesses to the cache line since insertion in the way is greater than zero, assigning a first replacement priority level to the cache line;
   responsive to determining that the set access count value associated with the cache line is not greater than the reuse distance and responsive to determining that the number of accesses to the cache line since insertion in the way is equal to zero, assigning a second replacement priority level to the cache line; and
   wherein the second replacement priority level represents a greater potential for selection for replacement than the first replacement priority level.

6. The method of claim 5, wherein assigning a replacement priority level to each cache line of at least a subset of the cache lines of the region of the cache further comprises:
   responsive to determining that the set access count value associated with the cache line is greater than the reuse distance and responsive to determining that a number of accesses to the cache line since insertion in the way is greater than zero, assigning a third replacement priority level to the cache line;
   responsive to determining that the set access count value associated with the cache line is greater than the reuse distance and responsive to determining that the number of accesses to the cache line since insertion in the way is equal to zero, assigning a fourth replacement priority level to the cache line;
   wherein the third replacement priority level represents a greater potential for selection for replacement than the first replacement priority level; and
   wherein the fourth replacement priority level represents a greater potential for selection for replacement than the second replacement priority level.

7. The method of claim 6, further comprising:
   selecting a cache line for replacement at the region of the cache based on the replacement priority level assigned to the cache.

8. The method of claim 1, wherein the region of the cache comprises the entirety of the cache.

9. The method of claim 1, further comprising determining the reuse distance in response to the count of the number of cache hits to the individual cache line.

10. The method of claim 1, further comprising counting a number of cache hits for each individual cache line of at least the subset of the cache lines of the region of the cache.

11. The method of claim 1, wherein the first number of accesses occurs prior to a first access to the given cache line of the given cache set and the second number of accesses occurs prior to a second access to the given cache line.

12. The method of claim 11, wherein the first number of accesses and the first access to the given cache line precede the second number of accesses and the second access to the given cache line.

13. A method for managing a cache of a processing system, comprising:
implementing, by a cache controller of the cache, a cache management policy for the insertion and replacement of cache lines of the cache, the cache management policy providing for assignment of replacement priority levels to each individual cache line of at least a subset of cache lines in a region of the cache based on a comparison of a number of accesses to a cache set having a way that stores a cache line since the cache line was last accessed to a reuse distance determined for the region of the cache, the reuse distance representing an average of at least a first number of accesses to a given cache set of the region per access to a given cache line of the given cache set and a second number of accesses to the given cache set per access to the given cache line, wherein the first number is different from the second number.

14. The method of claim 13, wherein implementing the cache management policy comprises:
maintaining a set access count value for each way of each cache set of at least a subset of cache sets of the region, the set access count value representing a number of accesses to the cache set since the cache line stored in the corresponding way was inserted or last accessed;
accumulating in an accumulated value the set access count values from each way of a cache set in the at least a subset of cache sets that is the target of a cache hit; and
after a specified number of cache hits to the at least a subset of cache sets, determining the reuse distance based on an averaging of the accumulated value by the specified number of cache hits.

15. The method of claim 14, wherein implementing the cache management policy further comprises:
maintaining a line access count value for each way of each cache set of the at least a subset of cache sets of the region, the line access count value representing a number of accesses to the cache line stored in the corresponding way.

16. The method of claim 15, wherein implementing the cache management policy further comprises:
assigning a replacement priority level to each cache line of at least a subset of cache lines of the region of the cache based on a comparison of the set access count value associated with the cache line and the reuse distance, and based on a determination whether the line access count value for the way storing the cache line is greater than or equal to zero.

17. The method of claim 16, wherein assigning a replacement priority level to each cache line comprises:
responsive to determining that the set access count value associated with the cache line is not greater than the reuse distance and responsive to determining that line access count associated with the cache line is greater than zero, assigning a first replacement priority level to the cache line;
responsive to determining that the set access count value associated with the cache line is not greater than the reuse distance and responsive to determining that line access count associated with the cache line is equal to zero, assigning a second replacement priority level to the cache line;
responsive to determining that the set access count value associated with the cache line is greater than the reuse distance and responsive to determining that the line access count associated with the cache line is greater than zero, assigning a third replacement priority level to the cache line;
responsive to determining that the set access count value associated with the cache line is greater than the reuse distance and responsive to determining that the line access responsive to determining that the set access count value associated with the cache line is greater than the reuse distance and responsive to determining that the line access count is equal to zero, assigning a fourth replacement priority level to the cache line;
wherein the second replacement priority level represents a greater potential for selection for replacement than the first replacement priority level and the third replacement priority level;
wherein the third replacement priority level represents a greater potential for selection for replacement than the first replacement priority level; and
wherein the fourth replacement priority level represents a greater potential for selection for replacement than the second replacement priority level.

18. A processor, comprising:
a cache comprising a plurality of cache sets, each cache set having a plurality of ways configured to store corresponding cache lines; and
a cache controller configured to implement a cache management policy for the insertion and replacement of cache lines of the cache, the cache management policy providing for assignment of replacement priority levels to each individual cache line of at least a subset of cache lines in a region of the cache based on a comparison of a number of accesses to a cache set having a way that stores the cache line since the cache line was last accessed to a reuse distance determined for the region of the cache, the reuse distance representing an average of at least a first number of accesses to a given cache set of the region per access to a given cache line of the given cache set and a second number of accesses to the given cache set per access to the given cache line, wherein the first number is different from the second number.

19. The processor of claim 18, wherein the cache comprises:
a plurality of set access counters, each set access counter associated with a corresponding way of a cache set of at least a subset of cache sets of the region of the cache and configured to store a set access count value representing a number of accesses to the cache set since the cache line stored in the corresponding way was inserted or last accessed;
an accumulator configured to accumulate in an accumulated value the set access count values from each way of a cache set of the at least a subset of cache sets that is the target of a cache hit; and
an averaging/scaling component configured to, responsive to detecting a specified number of cache hits to the at least a subset of cache sets, determining the reuse distance based on an averaging of the accumulated value by the specified number of cache hits.

20. The processor of claim 19, wherein the cache further comprises:
a plurality of line access counters, each line access counter associated with a corresponding way of a cache set of the at least a subset of cache sets and configured to store a line access count value representing a number of accesses to the cache line stored in the corresponding way.

21. The processor of claim 20, wherein the cache controller is configured to implement the cache management policy by:
   assigning a replacement priority level to each cache line of at least a subset of cache lines of the region of the cache based on a comparison of the set access count value associated with the cache line and the reuse distance, and based on a determination whether the line access count value for the way storing the cache line is greater than or equal to zero.

22. The processor of claim 21, wherein the cache controller is configured to assign a replacement priority level to a cache line of a cache set by:
   responsive to determining that the set access count value associated with the cache line is not greater than the reuse distance and responsive to determining that line access count associated with the cache line is greater than zero, assigning a first replacement priority level to the cache line;
   responsive to determining that the set access count value associated with the cache line is not greater than the reuse distance and responsive to determining that line access responsive to determining that the set access count value associated with the cache line is not greater than the reuse distance and responsive to determining that line access count associated with the cache line is equal to zero, assigning a second replacement priority level to the cache line;
   responsive to determining that the set access count value associated with the cache line is responsive to determining that the set access count value associated with the cache line is greater than the reuse distance and responsive to determining that the line access count associated with the cache line is greater than zero, assigning a third replacement priority level to the cache line;
   responsive to determining that the set access count value associated with the cache line is greater than the reuse distance and responsive to determining that the line access responsive to determining that the set access count value associated with the cache line is greater than the reuse distance and responsive to determining that the line access count is equal to zero, assigning a fourth replacement priority level to the cache line;
   wherein the second replacement priority level represents a greater potential for selection for replacement than the first replacement priority level and the third replacement priority level;
   wherein the third replacement priority level represents a greater potential for selection for replacement than the first replacement priority level; and
   wherein the fourth replacement priority level represents a greater potential for selection for replacement than the second replacement priority level.

23. The processor of claim 22, wherein the cache controller is configured to implement the cache management policy by:
   selecting a cache line of a cache set for replacement based on a comparison of replacement priority levels assigned to each cache line in the cache set.

24. The processor of claim 19, wherein:
   the specified number of cache hits is equal to $2^M$, M being an integer greater than 1; and
   the averaging/scaling component is configured to determine the reuse distance by right shifting the accumulated value by M bit positions.

* * * * *